United States Patent
Hallman

(10) Patent No.: US 10,408,304 B2
(45) Date of Patent: Sep. 10, 2019

(54) GEARS HAVING REDUCED ROLLER ELEMENT STRESSES AND METHODS OF MANUFACTURING SUCH GEARS

(71) Applicant: General Electric Company, Schenectady, NY (US)

(72) Inventor: Darren Lee Hallman, Scotia, NY (US)

(73) Assignee: General Electric Company, Schenectady, NY (US)

( * ) Notice: Subject to any disclaimer, the term of this patent is extended or adjusted under 35 U.S.C. 154(b) by 122 days.

(21) Appl. No.: 15/426,130

(22) Filed: Feb. 7, 2017

(65) Prior Publication Data

US 2018/0320758 A1 Nov. 8, 2018

(51) Int. Cl.
*F16H 1/36* (2006.01)
*F16H 1/28* (2006.01)
(Continued)

(52) U.S. Cl.
CPC ............ *F16H 1/2836* (2013.01); *F02C 7/36* (2013.01); *F03D 80/70* (2016.05); *F16C 19/26* (2013.01); *F16C 33/34* (2013.01); *F16H 55/17* (2013.01); *F16H 57/08* (2013.01); *F05B 2240/50* (2013.01); *F05B 2260/40311* (2013.01); *F05D 2260/40311* (2013.01); *F16C 19/28* (2013.01); *F16C 2360/23* (2013.01); *F16C 2360/31* (2013.01); *F16C 2361/61* (2013.01); *F16H 2057/085* (2013.01)

(58) Field of Classification Search
None
See application file for complete search history.

(56) References Cited

U.S. PATENT DOCUMENTS 6,770,007 B2 * 8/2004 Fox .................. F16C 19/386
475/348
6,872,049 B2 3/2005 Christensen
(Continued)

FOREIGN PATENT DOCUMENTS

| EP | 2803436 A2 | 11/2014 |
| EP | 3 048 318 A1 | 7/2016 |
| JP | 2016179822 A | 10/2016 |

OTHER PUBLICATIONS

NSK Bearings, Section 5, Bearing Internal Load Distribution and Displacement, pp. 110-139, Sep. 10, 2009 (Year: 2009).*
(Continued)

*Primary Examiner* — Dirk Wright
(74) *Attorney, Agent, or Firm* — Armstrong Teasdale LLP

(57) ABSTRACT

A gear having an axis of rotation includes a gear rim, with at least a portion of the gear rim configured to receive a load and define a loaded gear rim arc corresponding to the portion of the gear rim. A bearing pin extends axially through the gear rim, the gear rim and the bearing pin defining a roller element gap therebetween. The gear rim is configured to define a loaded roller element gap arc substantially concentric with the loaded gear rim arc, the loaded element gap arc having a loaded roller element gap arc length. The gear rim is further configured to retain a loaded bearing portion of the bearing within the portion of the roller element gap such that a loaded bearing portion length is in a range from and including about 75% to and including about 125% of the loaded roller element gap arc length.

20 Claims, 6 Drawing Sheets

(51) Int. Cl.
*F02C 7/36* (2006.01)
*F16H 57/08* (2006.01)
*F16H 55/17* (2006.01)
*F16C 19/26* (2006.01)
*F16C 33/34* (2006.01)
*F03D 80/70* (2016.01)
*F16C 19/28* (2006.01)

(56) References Cited

U.S. PATENT DOCUMENTS

| | | | |
|---|---|---|---|
| 6,994,651 B2* | 2/2006 | Fox | F16C 33/605 |
| | | | 475/335 |
| 7,297,086 B2* | 11/2007 | Fox | F16H 1/2836 |
| | | | 475/331 |
| 7,360,612 B2 | 4/2008 | Chen et al. | |
| 7,431,676 B2 | 10/2008 | Tesar | |
| 7,572,061 B2 | 8/2009 | Fox et al. | |
| 8,123,413 B2 | 2/2012 | Tambe et al. | |
| 8,172,717 B2 | 5/2012 | Lopez et al. | |
| 8,198,744 B2 | 6/2012 | Kern et al. | |
| 8,235,861 B2 | 8/2012 | Lopez et al. | |
| 8,287,423 B2 | 10/2012 | Lopez et al. | |
| 8,298,114 B2 | 10/2012 | Lopez et al. | |
| 8,430,788 B2* | 4/2013 | Fox | F16C 35/063 |
| | | | 475/347 |
| 8,459,872 B2 | 6/2013 | Nies et al. | |
| 8,491,435 B2 | 7/2013 | Ghanime et al. | |
| 8,500,591 B2* | 8/2013 | Turner | B60K 17/046 |
| | | | 180/343 |
| 8,506,446 B2 | 8/2013 | Minadeo et al. | |
| 8,517,672 B2 | 8/2013 | McCooey et al. | |
| 8,550,955 B2 | 10/2013 | Erno et al. | |
| 8,550,957 B2 | 10/2013 | Erno et al. | |
| 8,657,714 B1 | 2/2014 | Ghanime et al. | |
| 8,696,314 B2 | 4/2014 | Mashue et al. | |
| 8,727,629 B2 | 5/2014 | Do et al. | |
| 8,727,632 B2 | 5/2014 | Do et al. | |
| 8,777,802 B2* | 7/2014 | Erno | F16H 1/2836 |
| | | | 475/346 |
| 8,857,192 B2 | 10/2014 | Huang et al. | |
| 8,858,382 B2* | 10/2014 | Smith | F16H 57/0471 |
| | | | 475/160 |
| 8,904,746 B2 | 12/2014 | Fang et al. | |
| 8,920,284 B2* | 12/2014 | Fox | F16C 19/38 |
| | | | 384/128 |
| 9,011,010 B2 | 4/2015 | Mueller et al. | |
| 2003/0008748 A1* | 1/2003 | Fox | F16C 19/386 |
| | | | 475/346 |

OTHER PUBLICATIONS

NSK wayback machine report (Year: 2018).*
Effect of Internal Clearance on Load Distribution and Life of Radially Loaded Ball and Roller Bearings, NASA, Apr. 2012 (Year: 2012).*
Mathematical Model of Load Distribution in Rolling Bearing, FME transations, Dec. 2008 (Year: 2008).*
Calculation of radial load distribution on ball and roller bearings with positive, negative and zeron clearance, International Journal of Mechanical Sciences, Feb. 21, 2017 (Year: 2017).*
Yang et al., "Rigid-Flexible Coupled Dynamic Simulation of Aeroengine Main-Shaft High Speed Cylindrical Roller Bearing", 3rd International Conference on Advanced Computer Theory and Engineering(ICACTE), pp. 31-35, vol. 4, Aug. 20-22, 2010.
Tian et al., "Maintenance of Wind Turbine Systems Under Continuous Monitoring", Reliability and Maintainability Symposium (RAMS), pp. 1-6, Jan. 24-27, 2011.
Tiwari et al., "Optimization of Spherical Roller Bearing Design Using Artificial Bee Colony Algorithm and Grid Search Method", International Journal for Computational Methods in Engineering Science and Mechanics, pp. 221-233, vol. 16, Issue 4, Jul. 25, 2015.
Xu et al., "Dynamic Modeling and Contact Analysis of a Cycloid-Pin Gear Mechanism with a Turning Arm Cylindrical Roller Bearing", Mechanism and Machine Theory, pp. 327-349, vol. 104, Oct. 2016.
"Planetary wheel bearings in industrial gearboxes," Schaeffler Technologies, pp. 1-116 (Apr. 1, 2012) (See Abstract).
Extended European Search Report and Opinion issued in connection with corresponding EP Application No. 18155340.5 dated May 30, 2018.

* cited by examiner

US 10,408,304 B2

GEARS HAVING REDUCED ROLLER ELEMENT STRESSES AND METHODS OF MANUFACTURING SUCH GEARS

BACKGROUND

The field of the disclosure relates generally to a gear and corresponding method of manufacturing gears for use in epicyclic gear assemblies and, more particularly, to a gear and method of manufacturing a gear having reduced roller element stress when subject to a load.

Aircraft engines and similar turbine engines typically include a plurality of gearboxes including a plurality of gears. Some known gearboxes include epicyclic gear assemblies, which typically include an outer ring gear, a central or sun gear, and a plurality of planet gears disposed between the outer ring gear and the central gear and configured to engage both the ring gear and the central gear. During operation, a drive applies a rotational force to at least one of the ring gear, the plurality of planet gears, and the central gear, thereby inducing rotation of one or more of the other epicyclic gear assembly gears. Some known planet gears include a bearing pin and a roller element bearing disposed between the bearing pin and a gear rim of the planet gear.

During operation, a planet gear of an epicyclic gear assembly is subjected to forces by the sun gear and the ring gear to which the planet gear is coupled. The forces experienced by the planet gear generally induces a portion of the planet gear rim to become partially loaded and to deform in response to the applied load. For example, forces from the sun and the ring gear generally result in a pinching of the planet gear rim such that a first portion of the planet gear rim subject to stresses induced by the forces partially elongates while a second, unloaded portion remains substantially unchanged. In planet gears having roller element bearings, the roller element bearings are generally disposed in a roller element gap defined between the gear rim and a bearing pin. Accordingly, deformation of the gear rim may lead to uneven loading of the roller elements, decreasing their useful life and increasing the time and cost of maintaining corresponding epicyclic gear assemblies.

BRIEF DESCRIPTION

In one aspect, a gear having an axis of rotation is provided. The gear includes a gear rim, with at least a portion of the gear rim configured to receive a load and define a loaded gear rim arc corresponding to the at least a portion of the gear rim. A bearing pin extends axially through the gear rim, the gear rim and the bearing pin defining a roller element gap therebetween. A bearing is disposed within the roller element gap, the bearing including a plurality of roller elements circumferentially disposed about the bearing pin. The gear rim is configured to define a loaded roller element gap arc substantially concentric with the loaded gear rim arc, the loaded element gap arc extending through a portion of the roller element gap and having a loaded roller element gap arc length. The gear rim is further configured to retain a loaded bearing portion of the bearing within the portion of the roller element gap such that a loaded bearing portion length is in a first range from and including about 75% to and including about 125% of the loaded roller element gap arc length.

In another aspect, a gear assembly is provided. The gear assembly includes a sun gear, a ring gear, and a plurality of planet gears coupled to the ring gear and the sun gear, each planet gear of the plurality of planet gears having an axis of rotation. Each planet gear further includes gear rim, with at least a portion of the gear rim configured to receive a load and define a loaded gear rim arc corresponding to the at least a portion of the gear rim. A bearing pin extends axially through the gear rim, the gear rim and the bearing pin defining a roller element gap therebetween. A bearing is disposed within the roller element gap, the bearing including a plurality of roller elements circumferentially disposed about the bearing pin. The gear rim is configured to define a loaded roller element gap arc substantially concentric with the loaded gear rim arc, the loaded element gap arc extending through a portion of the roller element gap and having a loaded roller element gap arc length. The gear rim is further configured to retain a loaded bearing portion of the bearing within the portion of the roller element gap such that a loaded bearing portion length is in a first range from and including about 75% to and including about 125% of the loaded roller element gap arc length.

In yet another aspect, a method of manufacturing a gear is provided. The gear has an axis of rotation and includes a bearing pin extending axially through the gear rim, the gear rim and the bearing pin defining a roller element gap therebetween. A bearing is disposed within the roller element gap. The method includes applying at least some load to the gear rim and identifying a loaded gear rim arc corresponding to a loaded portion of the gear rim when a load is applied to the gear rim. The method further includes identifying a loaded roller element gap arc extending through the roller element gap substantially concentric with the loaded gear rim arc, the loaded roller element gap arc having a roller element gap arc length. The method also includes selecting the bearing such that, during loading of the gear, a loaded bearing portion of the bearing having a loaded bearing portion length is retained within the portion of the roller element gap. The loaded bearing portion length is in a range from and including about 75% to and including about 125% of the loaded roller element gap arc length. The method also includes inserting the bearing into the roller element gap.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Embodiments of the planet gear described herein reduce stresses on bearing roller elements of the planet gear by accounting for deformation of the planet gear induced by loading of the gear. To accommodate the deformation of the gear rim induced by loading of the gear, embodiments of planet gears described herein include roller elements having a predetermined roller element diameter based, in part, on the anticipated deformation of the gear rim induced by loading of the gear. More specifically, when subject to loading, the gear rim defines a loaded gear rim arc corresponding to the shape of the deformed portion of the gear rim. A loaded roller element arc having a loaded roller element arc length is similarly defined under loading. The loaded roller element arc is substantially concentric with the loaded gear rim arc and extends through the roller element gap. To facilitate even loading of the roller elements, the roller element diameter is chosen such that the sum of the diameters disposed along the loaded roller element arc during loading of the gear is near or equal to the loaded roller element arc length.

Figure 1:
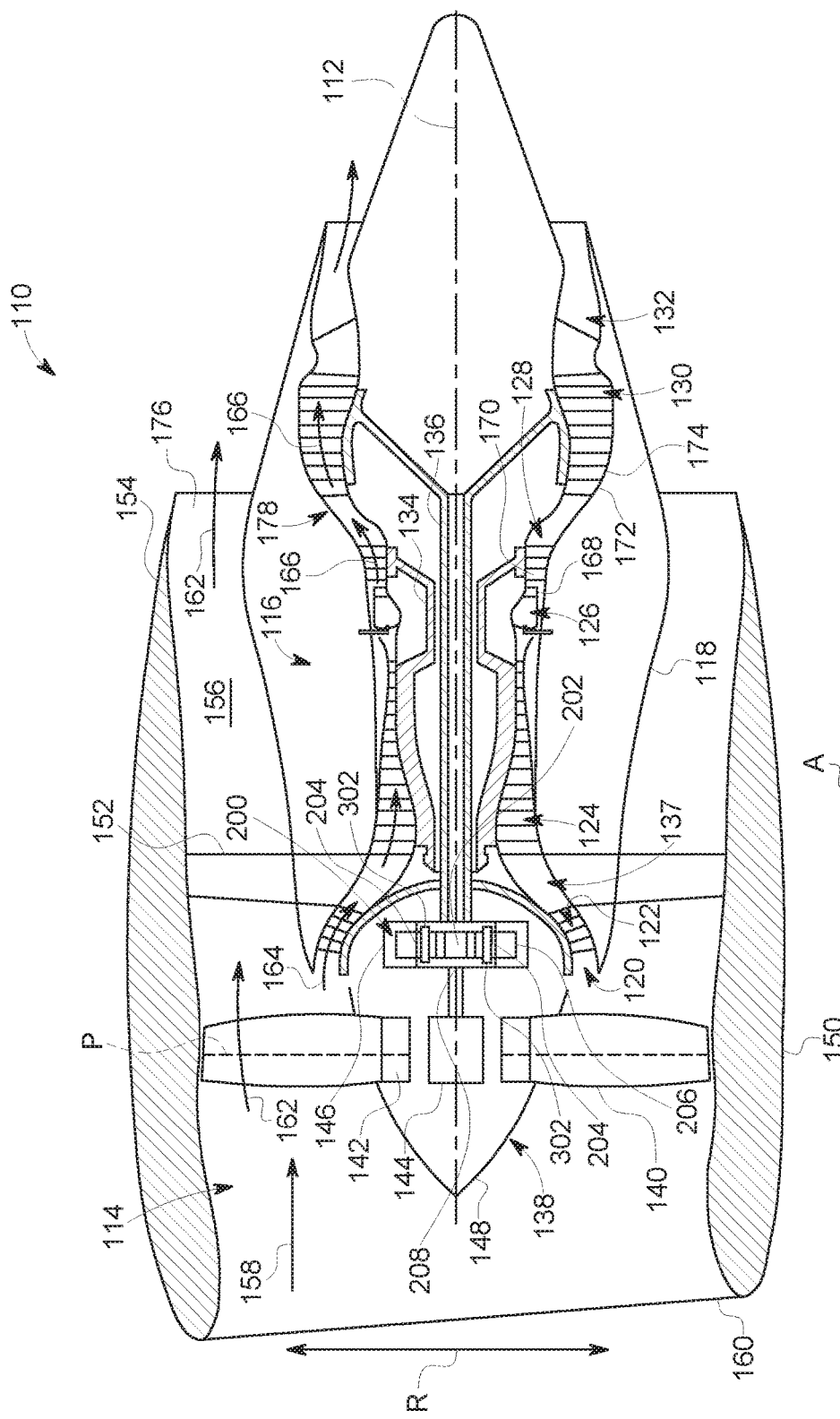
FIG. 1 is a schematic cross-sectional view of an exemplary gas turbine engine.

FIG. 1 is a schematic cross-sectional view of a gas turbine engine 110 in accordance with an exemplary embodiment of the present disclosure. In the exemplary embodiment, gas turbine engine 110 is a high-bypass turbofan jet engine 110, referred to herein as "turbofan engine 110." As shown in FIG. 1, turbofan engine 110 defines an axial direction A (extending parallel to a longitudinal centerline 112 provided for reference) and a radial direction R. In general, turbofan engine 110 includes a fan section 114 and a core turbine engine 116 disposed downstream from fan section 114.

Exemplary core turbine engine 116 depicted generally includes a substantially tubular outer casing 118 that defines an annular inlet 120. Outer casing 118 encases, in serial flow relationship, a compressor section 123 including a booster or low pressure (LP) compressor 122 and a high pressure (HP) compressor 124; a combustion section 126; a turbine section including a high pressure (HP) turbine 128 and a low pressure (LP) turbine 130; and a jet exhaust nozzle section 132. A high pressure (HP) shaft or spool 134 drivingly connects HP turbine 128 to HP compressor 124. A low pressure (LP) shaft or spool 136 drivingly connects LP turbine 130 to LP compressor 122. The compressor section 123, combustion section 126, turbine section, and nozzle section 132 together define a core air flowpath 137.

For the embodiment depicted, fan section 114 includes a variable pitch fan 138 having a plurality of fan blades 140 coupled to a disk 142 in a spaced apart manner. As depicted, fan blades 140 extend outwardly from disk 142 generally along radial direction R. Each fan blade 140 is rotatable relative to disk 142 about a pitch axis P by virtue of fan blades 140 being operatively coupled to a suitable pitch change mechanism 144 configured to collectively vary the pitch of fan blades 140 in unison. Fan blades 140, disk 142, and pitch change mechanism 144 are together rotatable about longitudinal axis 112 by LP shaft 136 across a power gear box 146. Power gear box 146 includes a plurality of gears for adjusting the rotational speed of fan 138 relative to LP shaft 136 to a more efficient rotational fan speed. In an alternative embodiment, fan blade 140 is a fixed pitch fan blade rather than a variable pitch fan blade.

In the exemplary embodiment, disk 142 is covered by rotatable front hub 148 aerodynamically contoured to promote an airflow through plurality of fan blades 140. Additionally, exemplary fan section 114 includes an annular fan casing or outer nacelle 150 that circumferentially surrounds fan 138 and/or at least a portion of core turbine engine 116. Nacelle 150 is configured to be supported relative to core turbine engine 116 by a plurality of circumferentially-spaced outlet guide vanes 152. A downstream section 154 of nacelle 150 extends over an outer portion of core turbine engine 116 so as to define a bypass airflow passage 156 therebetween.

During operation of turbofan engine 110, a volume of air 158 enters turbofan engine 110 through an associated inlet 160 of nacelle 150 and/or fan section 114. As volume of air 158 passes across fan blades 140, a first portion of air 158 as indicated by arrows 162 is directed or routed into bypass airflow passage 156 and a second portion of air 158 as indicated by arrow 164 is directed or routed into core air flowpath 137, or more specifically into LP compressor 122. The ratio between first portion of air 162 and second portion of air 164 is commonly known as a bypass ratio. The pressure of second portion of air 164 is then increased as it is routed through HP compressor 124 and into combustion section 126, where it is mixed with fuel and burned to provide combustion gases 166.

Combustion gases 166 are routed through HP turbine 128 where a portion of thermal and/or kinetic energy from combustion gases 166 is extracted by sequential stages of HP turbine stator vanes 168 that are coupled to outer casing 118 and HP turbine rotor blades 170 that are coupled to HP shaft or spool 134, thus inducing HP shaft or spool 134 to rotate, thereby supporting operation of HP compressor 124. Combustion gases 166 are then routed through LP turbine 130 where a second portion of thermal and kinetic energy is extracted from combustion gases 166 by sequential stages of LP turbine stator vanes 172 that are coupled to outer casing 118 and LP turbine rotor blades 174 that are coupled to LP shaft or spool 136, thus inducing LP shaft or spool 136 to rotate which induces power gear box 146 to rotate LP compressor 122 and/or rotation of fan 138.

Combustion gases 166 are subsequently routed through jet exhaust nozzle section 132 of core turbine engine 116 to provide propulsive thrust. Simultaneously, the pressure of first portion of air 162 is substantially increased as first portion of air 162 is routed through bypass airflow passage 156 before it is exhausted from a fan nozzle exhaust section 176 of turbofan engine 110, also providing propulsive thrust. HP turbine 128, LP turbine 130, and jet exhaust nozzle section 132 at least partially define a hot gas path 178 for routing combustion gases 166 through core turbine engine 116.

Exemplary turbofan engine 110 depicted in FIG. 1 is by way of example only, and that in other embodiments, turbofan engine 110 may have any other suitable configuration. In still other embodiments, aspects of the present disclosure may be incorporated into any other suitable gas turbine engine. For example, in other embodiments, aspects of the present disclosure may be incorporated into, e.g., a turboprop engine.

Figure 2:
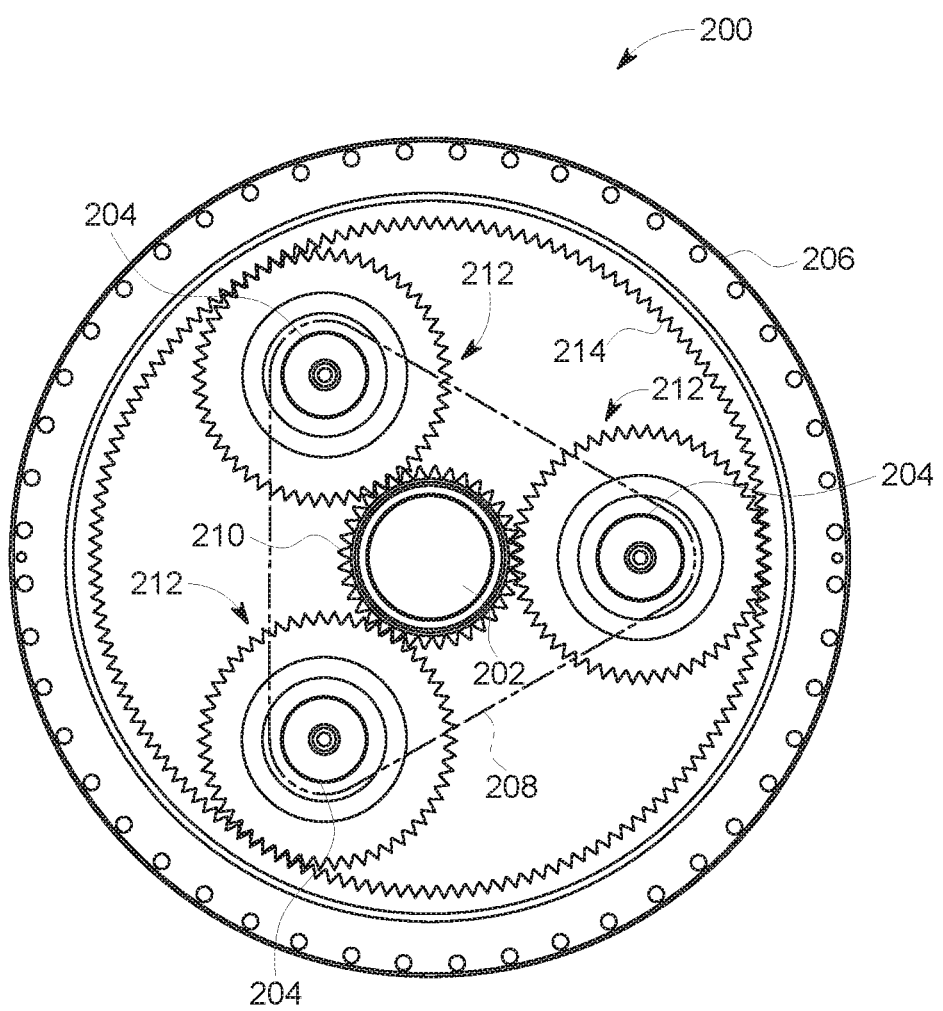
FIG. 2 is a schematic diagram of an exemplary epicyclic gear assembly of the gas turbine engine shown in FIG. 1.

FIG. 2 is a schematic diagram of epicyclic gear assembly 200 of gas turbine engine 110 (shown in FIG. 1). In the exemplary embodiment, epicyclic gear assembly 200 is a planetary gear train. In one embodiment, epicyclic gear assembly 200 is housed within power gearbox 146 (shown in FIG. 1). In other embodiments, epicyclic gear assembly 200 is located adjacent to power gearbox 146 and is mechanically coupled to it.

Epicyclic gear assembly 200 includes a sun gear 202, a plurality of planet gears 204, a ring gear 206, and a carrier 208. In alternative embodiments, epicyclic gear assembly 200 is not limited to three planet gears 204. Rather, any number of planet gears may be used that enables operation of epicyclic gear assembly 200 as described herein. In some embodiments, LP shaft or spool 136 (shown in FIG. 1) is fixedly coupled to sun gear 202. Sun gear 202 is configured to engage planet gears 204 through a plurality of complementary sun gear teeth 210 and a plurality of complementary planet gear teeth 212 circumferentially spaced about a radially outer periphery of sun gear 202 and a radially outer periphery of planet gears 204 respectively. Planet gears 204 are maintained in a position relative to each other using carrier 208. Planet gears 204 are fixedly coupled to power gearbox 146. Planet gears 204 are configured to engage ring gear 206 through a plurality of complementary ring gear teeth 214 and complementary planet gear teeth 212 circumferentially spaced about a radially inner periphery of ring gear 206 and a radially outer periphery of planet gears 204 respectively. Ring gear 206 is rotationally coupled to fan blades 140 (shown in FIG. 1), disk 142 (shown in FIG. 1), and pitch change mechanism 144 (shown in FIG. 1) extending axially from ring gear 206. LP turbine 130 rotates the LP compressor 122 at a constant speed and torque ratio which is determined by a function of ring gear teeth 214, planet gear teeth 212, and sun gear teeth 210 as well as how power gearbox 146 is restrained.

Epicyclic gear assembly 200 may be configured in three possible configurations: planetary, star, and solar. In the planetary configuration, ring gear 206 remains stationary while sun gear 202, planet gears 204, and carrier 208 rotate. LP shaft or spool 136 drives sun gear 202 which is configured to rotate planet gears 204 that are configured to rotate carrier 208. Carrier 208 drives fan blades 140, disk 142, and pitch change mechanism 144. Sun gear 202 and carrier 208 rotate in the same direction.

In the star configuration, carrier 208 remains stationary while sun gear 202 and ring gear 206 rotate. LP shaft or spool 136 drives sun gear 202 which is configured to rotate planet gears 204. Planet gears 204 are configured to rotate ring gear 206 and carrier 208 is fixedly coupled to power gearbox 146. Carrier 208 maintains planet gears 204 positioning while allowing planet gears 204 to rotate. Ring gear 206 is rotationally coupled to fan blades 140, disk 142, and pitch change mechanism 144. Sun gear 202 and ring gear 206 rotate in opposite directions.

In the solar configuration, sun gear 202 remains stationary while planet gears 204, ring gear 206, and carrier 208 rotate. LP shaft or spool 136 may drive either the ring gear 206 or carrier 208. When LP shaft or spool 136 is coupled to carrier 208, planet gears 204 are configured to rotate ring gear 206 which drives fan blades 140, disk 142, and pitch change mechanism 144. Ring gear 206 and carrier 208 rotate in the same direction.

In the solar configuration where LP shaft or spool 136 is coupled to ring gear 206, ring gear 206 is configured to rotate planet gears 204 and carrier 208. Carrier 208 drives fan blades 140, disk 142, and pitch change mechanism 144. Ring gear 206 and carrier 208 rotate in the same direction.

Figure 3:
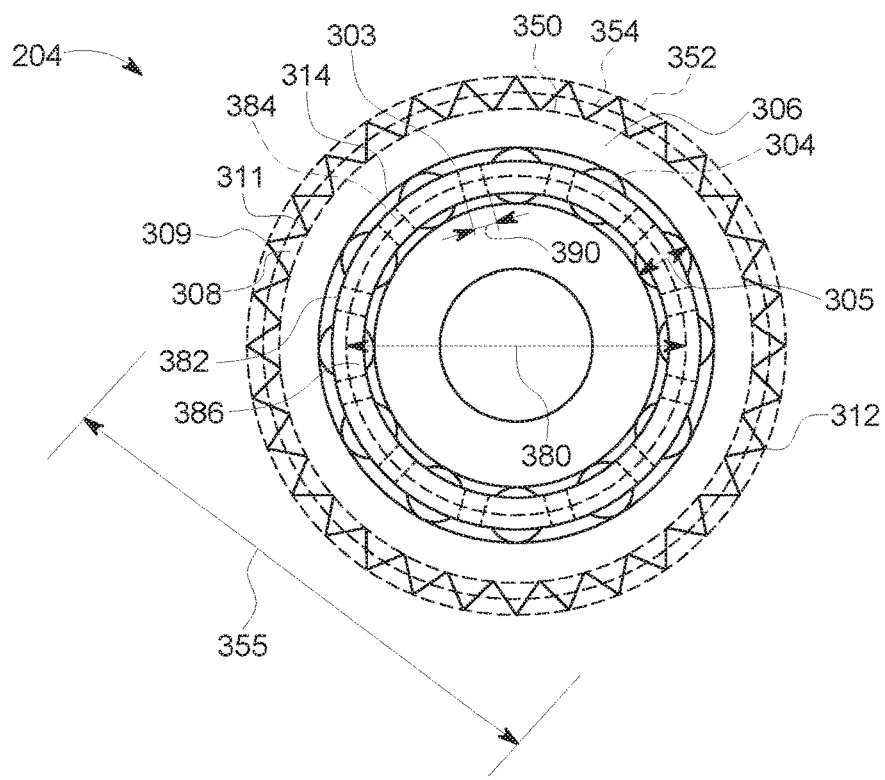
FIG. 3 is a schematic diagram of an exemplary planet gear of the epicyclic gear assembly shown in FIG. 2.
Figure 4:
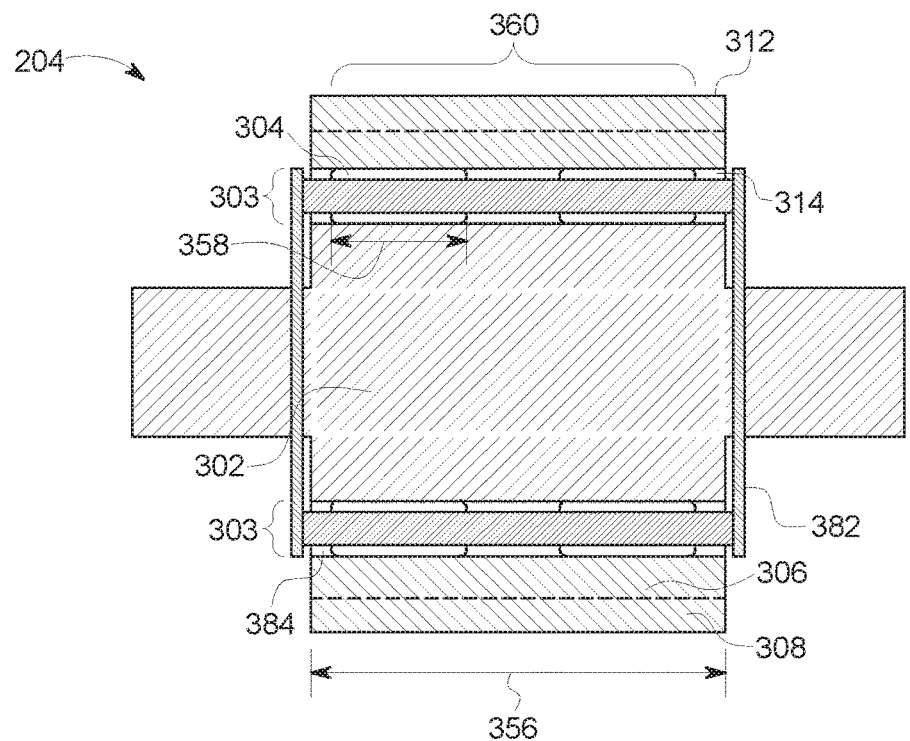
FIG. 4 is a schematic cross-sectional view of the exemplary planet gear shown in FIG. 3.

FIG. 3 is a schematic diagram of exemplary planet gear 204 of epicyclic gear assembly 200 (shown in FIG. 2). FIG. 4 is a cross-sectional view of exemplary planet gear 204. Planet gear 204 includes a bearing pin 302, a bearing 303, a gear rim 306, and a plurality of gear teeth 308. Gear rim 306 includes an outer radial surface 312, and an inner radial surface 314. Carrier 208 (shown in FIG. 2) is coupled to bearing pin 302. Gear teeth 308 are disposed circumferentially about outer radial surface 312. Each of gear teeth 308 includes a gear tooth tip 309. Adjacent gear teeth 308 define gear tooth spaces 311 therebetween. Planet gear 204 has a root circle 350, which coincides with the bottom of gear tooth spaces 311, and an addendum circle 352, which coincides with each of gear tooth tips 309. Planet gear 204 further has a pitch circle 354 having a gear pitch diameter 355. Bearing 303 has a bearing pitch diameter 380 and includes a plurality of roller elements 304 disposed between bearing pin 302 and gear rim 306 in a roller element gap 313. Each roller element 304 of the plurality of roller elements 304 has a roller element diameter 305. The plurality of roller elements 304 are retained within a bearing cage 382. Bearing cage 382 includes a forward plate 386 and an aft plate (not shown) opposite forward plate 388. A plurality of cage spacers 384 extend between roller elements 304 and are of a length that is greater than the length of roller elements 304, coupling forward plate 386 to aft plate 388 such that a space exists between the ends of roller elements 304 and the outer surfaces of forward plate 386 and aft plate 388. Each cage spacer 384 has a cage spacer width 390, each cage spacer 384 defining the space between adjacent roller elements 304. In alternative embodiments, planet gear 204 includes any combination of roller elements 304, spacers 384, bearing cages 382, and is of any dimension that facilitates epicyclic gear assembly 200 operating as described herein.

As shown in FIG. 4, exemplary planet gear 204 further has a gear rim length 356 and each of roller elements 304 have a roller element length 358. In the exemplary embodiment, roller elements 304 each have a substantially equal roller element length 358. In other embodiments, roller elements 304 have differing roller element lengths. In the exemplary embodiment, roller elements 304 are arranged in axially aligned roller element pairs 360 disposed about bearing pin 302.

Figure 5:
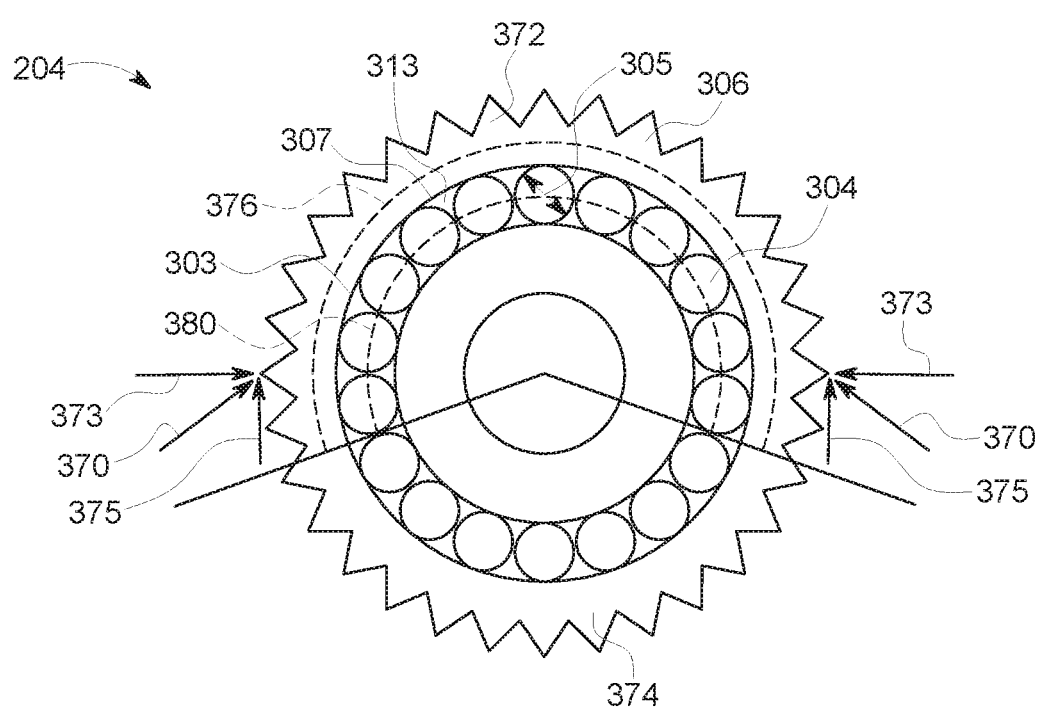
FIG. 5 is a schematic diagram of the exemplary planet gear planet gear shown in FIG. 3 in a loaded state.

FIG. 5 is a schematic diagram of exemplary planet gear 204 of epicyclic gear assembly 200 (shown in FIG. 2) in a loaded state. More specifically, FIG. 5 shows planet gear 204 with resultant radial and transverse forces inducing a deformation of gear rim 306. During operation, torsional movement of LP power shaft 136 induce sun gear 202 (shown in FIG. 3) and ring gear 206 (shown in FIG. 3) to exert resultant radial and transverse components of gear tooth forces 370 on gear rim 306. Resultant radial and transverse components of gear tooth forces 370 are equal in magnitude and represent the load through planet gear teeth 212 (shown in FIG. 2) from sun gear 202 on one side and from the ring gear 206 on the other side. Resultant radial and transverse components of gear tooth forces 370 include resultant radial component forces 373 and resultant tangential component forces 375. Resultant radial component forces 373 are equal and opposite respective radial components of resultant radial and transverse components of gear tooth forces 370. Resultant tangential component forces 375 are equal respective tangential components of gear tooth forces 370.

Resultant radial and transverse components of gear tooth forces 370 include a deformation or bending of gear rim 306. More specifically, gear tooth forces 370 and 373 compress and put in tension gear rim 306 and a corresponding load is applied to a first portion 372 of gear rim 306. In response to the load, first portion 372 generally deforms by elongating. The deformation depicted between FIGS. 3 and 5 is not drawn to scale and is intended merely to illustrate the deformation that occurs during operation of gear assembly 200. In contrast to first portion 372, a second portion 374 of gear rim 306 remains substantially unloaded during operation and, as a result, substantially retains its unloaded shape.

When subject to loading, first portion 372 generally defines a loaded gear rim arc 376. For purposes of this disclosure, loaded gear rim arc 376 generally refers to an arc extending through first portion 372, i.e., through the loaded portion of gear rim 306. Accordingly, as a result of the deformation of first portion 372, loaded gear rim arc 376 is generally ovoid in shape. Loaded gear rim arc 376 may rotate about gear rim 306 as planet gear 204 rotates within epicyclic gear assembly 200.

When loaded, gear rim 306 further defines a loaded roller element gap arc 378 having a loaded roller element gap arc length. Loaded roller element gap arc 378 is substantially concentric with loaded gear rim arc 376 and extends through roller element gap 313. During operation, a loaded bearing portion 307 of bearing 303 is retained within roller element gap 313 along loaded roller element gap arc 378. As a result, loaded bearing portion 307 is subject to loads resulting from gear tooth forces 370.

To facilitate improved bearing life, roller elements 304 are generally sized to facilitate even load distribution and general reduction of loads experienced by each roller element of the retained roller elements. In the exemplary embodiment, roller elements 304 are generally sized such that the sum of roller element diameters 305 and cage spacer widths 390 of the roller elements 304 and cage spacers 384 retained along within loaded bearing portion 307 during loading is in a range from and including about 75% to and including about 125% of the loaded roller element gap arc length.

In addition to the relationship between roller element diameter 305, cage spacer width 390, and the loaded roller element gap arc length, alternative embodiments of planet gear 204 have dimensions that further conform to other predefined ratios and relationships. For example, in one alternative embodiment, roller element length 358 and roller element diameter 305 are in a predefined ratio. More specifically, in such alternative embodiments, the predefined ratio between roller element length 358 and roller element diameter 305 for each roller element 304 is in a range from and including about 0.75 to and including about 2.0. In another alternative embodiment, roller element length 358 and gear rim length 356 are in a predefined ratio. For example, in such alternative embodiment, the ratio between roller element length 358 and gear rim length 356 is in a range including about 0.5 to and including about 1.0. In other alternative embodiments in which roller elements 304 are arranged in axially aligned pairs, a total roller pair length and gear rim length 356 are in accordance with a predefined ratio. More specifically, each axially aligned roller element pair 360 has a total roller pair length defined as the total length of roller elements in the respective axially aligned roller element pair 360. For example, in certain embodiments, the ratio of the total roller pair length to gear rim length is in a range from and including about 0.5 to and including about 1.0. In still another alternative embodiment, gear rim length 356 and gear pitch diameter 355 are in a predefined ratio. For example, in certain embodiments, the ratio of gear rim length 356 to gear pitch diameter 355 is in a range from and including about 0.75 to and including about 2.0. In a further alternative embodiment, the diameter of roller elements 304 and the bearing pitch diameter are in a predefined ratio. For example, in certain embodiments, the ratio of the diameter of roller elements to bearing pitch diameter is in a range from and including about 0.08 to and including about 0.3. In another embodiment, cage spacer width 390 is defined with respect to roller element diameter 305 such the ration of cage spacer width 390 to roller element diameter 305 is in a range from and including about 0.01 to and including 0.50.

Figure 6:
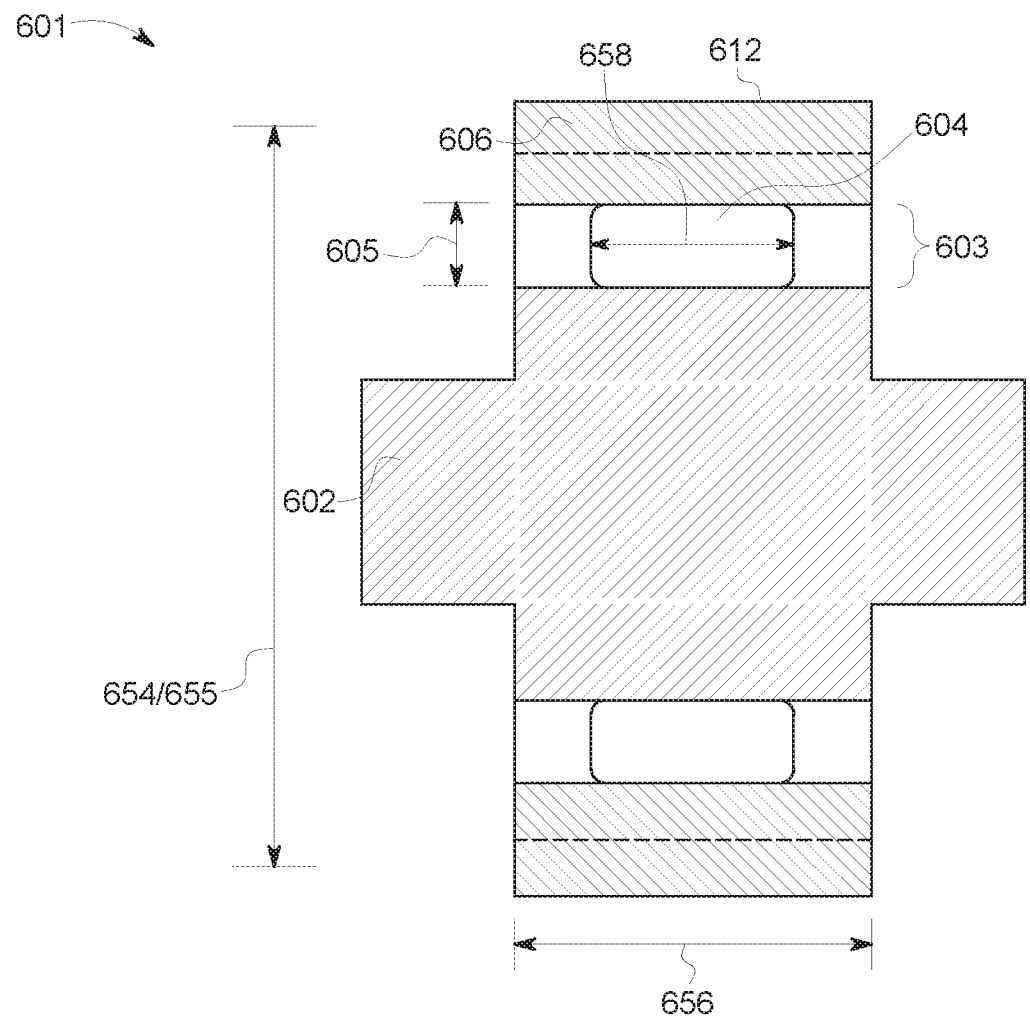
FIG. 6 is a cross-sectional view of an alternative planet gear that may be used in the epicyclic gear assembly shown in FIG. 2.

FIG. 6 is a cross-sectional view of an alternative planet gear 601 that may be used in epicyclic gear assembly 200 (shown in FIG. 2). Planet gear 601 includes a bearing pin 602, a bearing 603, a gear rim 606, and a plurality of gear teeth 608. Gear rim 606 includes an outer radial surface 612, and an inner radial surface 614. Planet gear 601 has a pitch circle 654 having a gear pitch diameter 655. Bearing 603 includes a plurality of roller elements 604 disposed between bearing pin 602 and gear rim 606. In contrast to roller elements 304 (shown in FIGS. 3-5), which are arranged in axially aligned roller element pairs 360 (shown in FIG. 4), the plurality of roller elements 604 are arranged in a single ring about bearing pin 602. Planet gear 601 further has a gear rim length 656. Each roller element of the plurality of roller elements 604 has a roller element diameter 605 and a roller element length 658.

When subject to loading, gear rim 606 defines a loaded gear rim arc (not shown) and a loaded roller element gap arc (not shown) that is substantially concentric with the loaded gear rim arc, the loaded roller element gap arc having a loaded roller element gap arc length. During operation, at least a portion of roller elements 604 are retained within roller element gap 613 along the loaded roller element gap arc. In planet gear 601, roller elements 604 are generally sized such that the sum of roller element diameters 605 of the roller elements retained along the loaded roller element gap arc during operation is in a range from and including about 75% to and including about 125% of loaded roller element gap arc length.

In an alternative embodiment, roller element length 658 and roller element diameter 605 of each roller element 604 are in a predefined ratio. For example, in certain embodiments, the predefined ratio between roller element length 658 and roller element diameter 605 for each roller element 604 is in a range from and including about 0.75 to and including about 2.0. In another alternative embodiment, roller element length 658 and gear rim length 656 are in a predefined ratio. For example, in certain embodiments, the predefined ratio of roller element length 658 to gear rim length 656 is in a range from and including about 0.5 to and including about 1.0.

Figure 7:
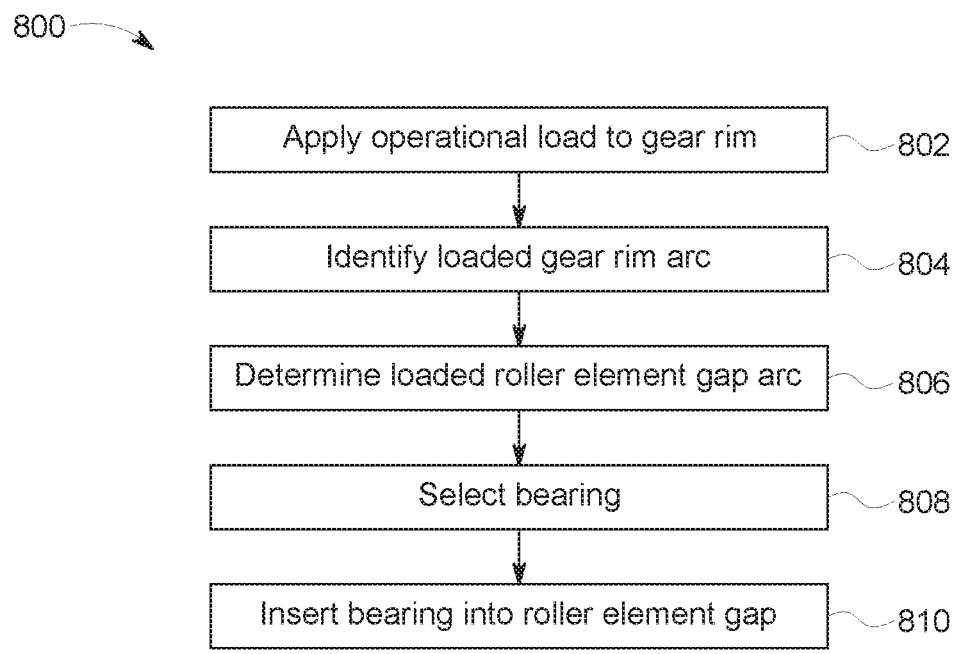
FIG. 7 is a flow chart illustrating a method of manufacturing a planet gear that may be used in the epicyclic gear assembly shown in FIG. 2.

FIG. 7 is a flow chart illustrating a method 800 of manufacturing a planet gear 204 (shown in FIGS. 2-5) for use in epicyclic gear assembly 200 (shown in FIG. 2). At steps 802 and 804, a load is applied to gear rim 306 and a loaded gear rim arc 376 corresponding to a first portion 372 of gear rim 306 (each shown in FIG. 5) is identified based on application of the load. Identification of loaded gear rim arc 376 may be conducted in various ways including, without limitation, computer modelling and empirical testing. For example, in certain embodiments, a computer model of gear rim 306 is generated and subjected to simulated loads corresponding to the actual loads. Loaded gear rim arc 376 may then be determined by analyzing the resulting deformation of the model when subjected to the simulated load. In other embodiments, a test gear rim substantially similar to gear rim 306 may be manufactured and subjected to loading corresponding to the actual loads. Resulting deformation of the test gear rims may be measured using suitable known measurement techniques to determine loaded gear rim arc 376.

At step 806, loaded roller element gap arc 378 is determined. Loaded roller element gap arc 378 has a loaded roller element gap arc length and is generally an arc extending through roller element gap 313 when gear rim 306 is subjected to loading. Accordingly, loaded roller element gap arc 378 is substantially concentric with loaded gear rim arc 376. Similar to loaded gear rim arc 376, determination of loaded roller element gap arc 378 may be conducted in various ways including, without limitation, computer modelling and empirical testing.

At step 808, bearing 303 (shown in FIGS. 3-5) is selected More specifically, bearing 303 is selected such that, during loading, a loaded bearing portion having a loaded bearing portion length is retained along loaded roller element gap arc 378. The loaded bearing portion length is in a range from and including about 75% to and including about 125% of loaded roller element gap arc length. In gears having bearings containing roller elements without bearing cages, the loaded bearing portion length is defined as the sum of the roller diameters 305 retained within the loaded bearing portion. In gears having bearing cages, such as bearing 703 of gear 701 (shown in FIG. 1), the loaded bearing portion length is defined as the sum of the roller diameters 705 retained within the loaded bearing portion plus the cumulative width of the cage fingers 758 separating the roller elements. At step 810, the selected bearing 303 is inserted into gear rim 306.

The above-described gear and corresponding methods of manufacturing the above-described gear provide for efficient load distribution among roller elements of a gear having a roller element bearing. Specifically, loading of the gear generally induces deformation of a gear rim of the gear such that the deformed gear rim defines a loaded gear rim arc. A roller element gap is similarly deformed during loading such that a loaded roller element gap arc is defined through the roller element gap, the loaded roller element gap arc being substantially concentric with the loaded gear rim arc and having a loaded roller element gap arc length. The diameter of the roller elements is chosen such that the sum of the diameters of roller elements retained along the loaded roller element gap arc during loading of the gear is near or equal to the loaded roller element gap arc length.

An exemplary technical effect of the methods, systems, and apparatus described herein includes at least one of: (a) improving distribution of loads between bearing roller elements during loading of the gear; (b) reducing peak stresses experienced by individual roller elements during loading of the gear; (c) improving operational life of roller elements resulting in reduced maintenance time and costs; (d) improving force transmission between the gear, the bearing pin, and structures to which the gear are coupled by the bearing pin; (e) increasing overall reliability of the gear and an epicyclic gear assembly in which the gear is used; (f) increasing the efficiency of the epicyclic gear assembly; and (g) increasing the power output of the epicyclic gear assembly.

Exemplary embodiments of a gear are described above in detail. The gear is not limited to the specific embodiments described herein, but rather, components of systems and/or steps of the methods may be utilized independently and separately from other components and/or steps described herein. For example, the methods may also be used in combination with other systems which require a gear, and are not limited to practice with only the systems and methods as described herein. Rather, the exemplary embodiment may be implemented and utilized in connection with many other machinery applications that require bearing pins.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A gear having an axis of rotation, said gear comprising:
   a gear rim, wherein at least a portion of said gear rim is configured to:
      receive a load;
      define a loaded gear rim arc corresponding to said at least a portion of said gear rim; and
   a bearing pin extending axially through said gear rim, said gear rim and said bearing pin defining a roller element gap therebetween; and
   a bearing disposed within said roller element gap, said bearing comprising a plurality of roller elements circumferentially disposed about said bearing pin, wherein each roller element of said plurality of roller elements has a roller element diameter, and wherein said gear rim is configured to:
      define a loaded roller element gap arc substantially concentric with the loaded gear rim arc, the loaded roller element gap arc extending through a portion of the roller element gap and having a loaded roller element gap arc length; and
      retain a loaded bearing portion of said bearing within the portion of the roller element gap such that a loaded bearing portion length is in a first range from and including about 75% to and including about 125% of the loaded roller element gap arc length, wherein the loaded bearing portion length is defined as a sum of the roller element diameters of roller elements within the loaded bearing portion.

2. The gear in accordance with claim 1, wherein said each roller element of said plurality of roller elements has a roller element length, the roller element diameter and the roller element length defining a ratio in a second range from and including about 0.75 to and including about 2.0.

3. The gear in accordance with claim 1, wherein said plurality of roller elements is arranged in axially aligned roller element pairs.

4. The gear in accordance with claim 3, wherein:
said each roller element of said plurality of roller elements has a roller element length;
said gear rim has a gear rim length; and
each axially aligned roller element pair of said plurality of axially aligned roller element pairs has a total roller pair length, the total roller pair length equal to a total length of roller elements in the axially aligned roller element pair, the gear rim length and the total roller pair length defining a ratio in a second range from and including about 0.5 to and including about 1.0.

5. The gear in accordance with claim 1, wherein said each roller element of said plurality of roller elements has a roller element length and said gear rim has a gear rim length, the roller element length and the gear rim length defining a ratio in a second range from and including about 0.5 to and including about 1.0.

6. The gear in accordance with claim 1, wherein said gear rim has a gear rim length and a gear pitch diameter defining a ratio in a second range from and including about 0.75 to and including about 2.0.

7. The gear in accordance with claim 1, said bearing having a bearing pitch diameter, wherein the roller element diameter and the bearing pitch diameter define a ratio in a second range from and including about 0.08 to and including about 0.3.

8. A gear assembly comprising:
a sun gear;
a ring gear; and
a plurality of planet gears coupled to said ring gear and said sun gear, each planet gear of said plurality of planet gears having an axis of rotation, said gears comprising:
a gear rim, wherein at least a portion of said gear rim is configured to:
receive a load; and
define a loaded gear rim arc corresponding to said at least a portion of said gear rim; and
a bearing pin extending axially through said gear rim, said gear rim and said bearing pin defining a roller element gap therebetween; and
a bearing disposed within said roller element gap, said bearing comprising a plurality of roller elements circumferentially disposed about said bearing pin and a bearing cage comprising a plurality of cage fingers, each cage finger of said plurality of cage fingers having a cage finger width and extending between adjacent roller elements of said plurality of roller elements, wherein each roller element of said plurality of roller elements has a roller element diameter, and wherein said gear rim is configured to:
define a loaded roller element gap arc substantially concentric with the loaded gear rim arc, the loaded roller element gap arc extending through a portion of the roller element gap and having a loaded roller element gap arc length; and
retain a loaded bearing portion of said bearing within the portion of the roller element gap such that a loaded bearing portion length is in a first range from and including about 75% to and including about 125% of the loaded roller element gap arc length, wherein the loaded bearing portion length is defined as a sum of the roller element diameters of roller elements retained within the loaded bearing portion plus the finger widths of cage fingers retained within the loaded bearing portion.

9. The gear assembly in accordance with claim 8, wherein said each roller element of said plurality of roller elements has a roller element length, the roller element diameter and the roller element length defining a ratio in a second range from and including about 0.75 to and including about 2.0.

10. The gear assembly in accordance with claim 8, wherein:
said plurality of roller elements is arranged in axially aligned roller element pairs;
said each roller element of said plurality of roller elements has a roller element length;
said gear rim has a gear rim length; and
each axially aligned roller element pair of said plurality of axially aligned roller element pairs has a total roller pair length, the total roller pair length equal to a total length of roller elements in the axially aligned roller element pair, the gear rim length and the total roller pair length defining a ratio in a second range from and including about 0.5 to and including about 1.0.

11. The gear assembly in accordance with claim 8, wherein said each roller element of said plurality of roller elements has a roller element length and said gear rim has a gear rim length, the roller element length and the gear rim length defining a ratio in a second range from and including about 0.5 to and including about 1.0.

12. The gear assembly in accordance with claim 8, wherein said gear rim has a gear rim length and a gear pitch diameter defining a ratio in a second range from and including about 0.75 to and including about 2.0.

13. The gear assembly in accordance with claim 8 further comprising a bearing comprising said plurality of roller elements, a bearing cage, and a plurality of cage spacers, said bearing having a bearing pitch diameter, wherein said roller element diameter and said bearing pitch diameter define a ratio in a second range from and including about 0.08 to and including about 0.3, and wherein the roller element diameter and the cage spacer width define a ratio in a rage from and including about 0.01 to and including about 0.50.

14. A method of manufacturing a gear having an axis of rotation, the gear including a bearing pin extending axially through a gear rim, the gear rim and the bearing pin defining a roller element gap therebetween, and a bearing disposed within the roller element gap, the bearing including a plurality of roller elements circumferentially disposed about the bearing pin, wherein each roller element of the plurality of roller elements has a roller element diameter, said method comprising:
applying at least some load to the gear rim;
identifying a loaded gear rim arc corresponding to a loaded portion of the gear rim when the load is applied to the gear rim;
determining a loaded roller element gap arc extending through the roller element gap substantially concentric with the loaded gear rim arc, the loaded roller element gap arc having a roller element gap arc length;
selecting the bearing such that, a loaded bearing portion of the bearing having a loaded bearing portion length is retained within the portion of the roller element gap, the loaded bearing portion length in a range from and including about 75% to and including about 125% of the loaded roller element gap arc length, wherein the loaded bearing portion length is defined as a sum of the roller element diameters of roller elements within the loaded bearing portion; and inserting the bearing into the roller element gap.

15. A gear having an axis of rotation, said gear comprising:
a gear rim, wherein at least a portion of said gear rim is configured to:
  receive a load;
  define a loaded gear rim arc corresponding to said at least a portion of said gear rim; and
a bearing pin extending axially through said gear rim, said gear rim and said bearing pin defining a roller element gap therebetween; and
a bearing disposed within said roller element gap, said bearing comprising a plurality of roller elements circumferentially disposed about said bearing pin and a bearing cage comprising a plurality of cage fingers, each cage finger of said plurality of cage fingers having a cage finger width and extending between adjacent roller elements of said plurality of roller elements, wherein each roller element of said plurality of roller elements has a roller element diameter, and wherein said gear rim is configured to:
  define a loaded roller element gap arc substantially concentric with the loaded gear rim arc, the loaded roller element gap arc extending through a portion of the roller element gap and having a loaded roller element gap arc length; and
  retain a loaded bearing portion of said bearing within the portion of the roller element gap such that a loaded bearing portion length is in a range from and including about 75% to and including about 125% of the loaded roller element gap arc length, wherein the loaded bearing portion length is defined as a sum of the roller element diameters of roller elements retained within the loaded bearing portion plus the finger widths of cage fingers retained within the loaded bearing portion.

16. A gear having an axis of rotation, said gear comprising:
a gear rim, wherein at least a portion of said gear rim is configured to:
  receive a load;
  define a loaded gear rim arc corresponding to said at least a portion of said gear rim; and
a bearing pin extending axially through said gear rim, said gear rim and said bearing pin defining a roller element gap therebetween; and
a bearing disposed within said roller element gap, said bearing comprising a plurality of roller elements circumferentially disposed about said bearing pin, wherein said each roller element of said plurality of roller elements has a roller element diameter and a roller element length, the roller element diameter and the roller element length defining a ratio in a first range from and including about 0.75 to and including about 2.0, and wherein said gear rim is configured to:
  define a loaded roller element gap arc substantially concentric with the loaded gear rim arc, the loaded roller element gap arc extending through a portion of the roller element gap and having a loaded roller element gap arc length; and
  retain a loaded bearing portion of said bearing within the portion of the roller element gap such that a loaded bearing portion length is in a second range from and including about 75% to and including about 125% of the loaded roller element gap arc length.

17. A gear having an axis of rotation, said gear comprising:
a gear rim, wherein at least a portion of said gear rim is configured to:
  receive a load;
  define a loaded gear rim arc corresponding to said at least a portion of said gear rim; and
a bearing pin extending axially through said gear rim, said gear rim and said bearing pin defining a roller element gap therebetween; and
a bearing disposed within said roller element gap, said bearing comprising a plurality of roller elements circumferentially disposed about said bearing pin, wherein said plurality of roller elements is arranged in axially aligned roller element pairs, and wherein said gear rim is configured to:
  define a loaded roller element gap arc substantially concentric with the loaded gear rim arc, the loaded roller element gap arc extending through a portion of the roller element gap and having a loaded roller element gap arc length; and
  retain a loaded bearing portion of said bearing within the portion of the roller element gap such that a loaded bearing portion length is in a range from and including about 75% to and including about 125% of the loaded roller element gap arc length.

18. A gear having an axis of rotation, said gear comprising:
a gear rim, wherein at least a portion of said gear rim is configured to:
  receive a load;
  define a loaded gear rim arc corresponding to said at least a portion of said gear rim; and
a bearing pin extending axially through said gear rim, said gear rim and said bearing pin defining a roller element gap therebetween; and
a bearing disposed within said roller element gap, said bearing comprising a plurality of roller elements circumferentially disposed about said bearing pin, wherein said each roller element of said plurality of roller elements has a roller element length and said gear rim has a gear rim length, the roller element length and the gear rim length defining a ratio in a first range from and including about 0.5 to and including about 1.0, and wherein said gear rim is configured to:
  define a loaded roller element gap arc substantially concentric with the loaded gear rim arc, the loaded roller element gap arc extending through a portion of the roller element gap and having a loaded roller element gap arc length; and
  retain a loaded bearing portion of said bearing within the portion of the roller element gap such that a loaded bearing portion length is in a second range from and including about 75% to and including about 125% of the loaded roller element gap arc length.

19. A gear having an axis of rotation, said gear comprising:
a gear rim having a gear rim length and a gear pitch diameter defining a ratio in a first range from and including about 0.75 to and including about 2.0, wherein at least a portion of said gear rim is configured to:

receive a load;
    define a loaded gear rim arc corresponding to said at least a portion of said gear rim; and
a bearing pin extending axially through said gear rim, said gear rim and said bearing pin defining a roller element gap therebetween; and
a bearing disposed within said roller element gap, said bearing comprising a plurality of roller elements circumferentially disposed about said bearing pin, wherein said gear rim is configured to:
    define a loaded roller element gap arc substantially concentric with the loaded gear rim arc, the loaded roller element gap arc extending through a portion of the roller element gap and having a loaded roller element gap arc length; and
    retain a loaded bearing portion of said bearing within the portion of the roller element gap such that a loaded bearing portion length is in a second range from and including about 75% to and including about 125% of the loaded roller element gap arc length.

20. A gear having an axis of rotation, said gear comprising:
    a gear rim, wherein at least a portion of said gear rim is configured to:
        receive a load;
        define a loaded gear rim arc corresponding to said at least a portion of said gear rim; and
    a bearing pin extending axially through said gear rim, said gear rim and said bearing pin defining a roller element gap therebetween; and
    a bearing having a bearing pitch diameter and disposed within said roller element gap, said bearing comprising a plurality of roller elements circumferentially disposed about said bearing pin, wherein said each roller element of said plurality of roller elements has a roller element diameter, wherein the roller element diameter and the bearing pitch diameter define a ratio in a first range from and including about 0.08 to and including about 3.0, and wherein said gear rim is configured to:
        define a loaded roller element gap arc substantially concentric with the loaded gear rim arc, the loaded roller element gap arc extending through a portion of the roller element gap and having a loaded roller element gap arc length; and
        retain a loaded bearing portion of said bearing within the portion of the roller element gap such that a loaded bearing portion length is in a second range from and including about 75% to and including about 125% of the loaded roller element gap arc length.

* * * * *